United States Patent [19]

Dinsel

[11] Patent Number: 5,325,127
[45] Date of Patent: Jun. 28, 1994

[54] PROCESS FOR TRANSMITTING DIGITAL DATA, IN PARTICULAR SOUND DATA, IN A TV CHANNEL

[75] Inventor: Siegfried Dinsel, München, Fed. Rep. of Germany

[73] Assignee: Telefunken, Fed. Rep. of Germany

[21] Appl. No.: 914,725

[22] Filed: Jul. 17, 1992

[30] Foreign Application Priority Data

Dec. 22, 1989 [DE] Fed. Rep. of Germany ....... 3942570

[51] Int. Cl.$^5$ .......................... H04N 7/06; H04N 7/04
[52] U.S. Cl. .................................. 348/473; 348/484; 348/487
[58] Field of Search ............... 358/143, 144, 196, 198; 455/3, 4; 348/484, 473, 480, 482, 473, 487

[56] References Cited

U.S. PATENT DOCUMENTS

| | | | |
|---|---|---|---|
| 4,079,419 | 3/1978 | Siegle | 358/143 |
| 4,405,944 | 9/1983 | Eilers | 358/144 |
| 4,821,120 | 4/1989 | Tomlinson | 358/142 |
| 5,029,003 | 7/1991 | Jonnalagadda | 358/143 |
| 5,075,773 | 12/1991 | Pullen | 358/142 |
| 5,212,551 | 5/1993 | Conanan | 358/143 |

*Primary Examiner*—Mark R. Powell
*Assistant Examiner*—Chris Grant
*Attorney, Agent, or Firm*—Joseph S. Tripoli; Eric P. Herrmann; Ronald H. Kurdyla

[57] ABSTRACT

In a method of transmitting digitally coded information in a television sound channel, the digitally coded information is inserted on an existing frequency-modulated RF sound carrier as a channel-coded signal above the television audio-frequency base spectrum in the base band. The modulation amplitude is selected so that disturbances during reproduction of the television sound are excluded in the receiver. The spectrum of the channel-coded signal is evenly distributed over the available frequency range using a pseudo-signal during modulation intervals. The clock frequency of the channel-coded signal is coupled with the line frequency.

12 Claims, 1 Drawing Sheet

PROCESS FOR TRANSMITTING DIGITAL DATA, IN PARTICULAR SOUND DATA, IN A TV CHANNEL

This is a continuation of PCT application PCT/EP 90/02153 filed Dec. 11, 1990 by Siegfried Dinsel and titled "Process For Transmitting Digital Data, In Particular Sound Data, In A TV Channel".

Throughout the world, an FM-modulated RF sound carrier is inserted above the picture signal, for example, at 5.5 MHz, this carrier is used to transmit a monophonic television audio signal. For the transmission of additional stereophonic programs, in either Japan or the USA for example, the existing sound carrier in the FM or AM frequency multiplex may also be modulated with the stereophonic difference signal L-R or (for example, Federal Republic of German) a second frequency-modulated RF sound carrier at, for example, 5.75 MHz may be modulated with the stereophonic signal component R or (South Korea) L-R. Instead of stereophonic programs, bilingual programs can be transmitted in the same way (dual sound transmission). On the receiver side, the automatic switching between the various operating modes (e.g. mono, stereo or dual sound) switching is achieved by adding a carrier to the stereophonic component, or a foreign language channel can be added at 55 kHz in the base band. In (NICAM) switching is achieved using a bit stream rate of 720 kbit/s which is transmitted on the second RF sound carrier instead of an analog signal component.

Compact disc technology has led to an increased awareness of the quality of sound reproduction on the part of the consumer and pure analog television sound transmission, even with stereophonic reproduction, is no longer satisfactory. The known digital sound signal transmission on an auxiliary RF sound carrier requires an unfavorable positioning of the RF sound carrier on the edge of the 7 MHz-wide television channel due to the high bit stream rate of 720 kbit/s, resulting in crosstalk with the neighboring television channel. In countries, the Federal Republic of Germany for example, in which a second RF sound carrier is already FM-modulated with an analog stereophonic signal component, the known NICAM method cannot be used at all.

According to DE-A-1 809 943 an analog coded facsimile signal is transmitted within a television audio signal above the audiofrequency base spectrum. However, the spectrum of this signal is strongly dependent upon picture contents and can lead to disturbance of picture or sound during television reception.

In DE-A-3 718 906 additional RF sound carriers, modulated with digitally coded audio signals, are proposed. Such additional sound carriers can lead either to disturbance in the picture signal or in the adjacent television channel. Moreover, a high additional expenditure in circuitry is required for both the transmitter side and the receiver side.

Accordingly, the object of the invention consists of transmitting additional digitally, coded data in an existing television system with little additional expenditure in circuitry and while avoiding disturbance of the normal television reception.

The invention is explained with reference to the drawings in which.

Figure 1:
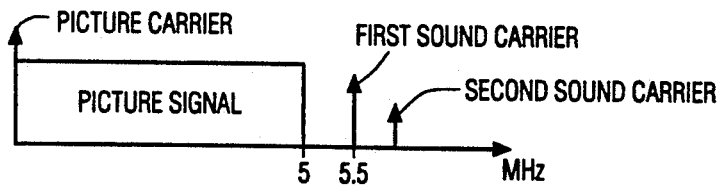
FIG. 1 shows an RF frequency spectrum of the television channel with two sound carriers.
Figure 2A:
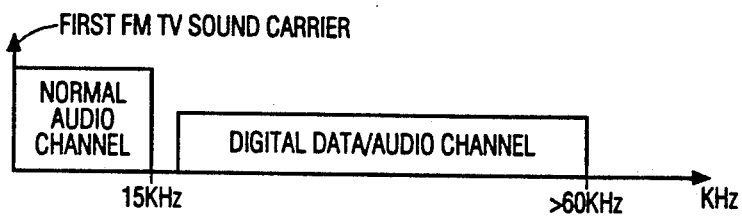
FIG. 2a is a frequency diagram of the base band of the sound/data signal modulated onto the first sound carrier according to FIG. 1.
Figure 2B:
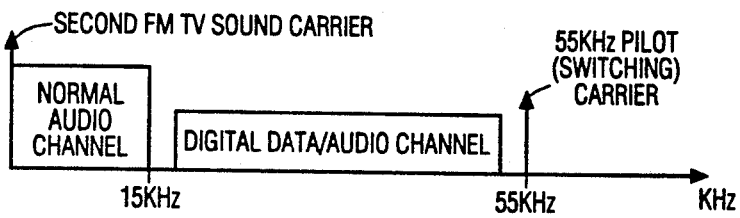
FIG. 2b is a frequency diagram of the base band of the sound/data signal modulated onto the second sound carrier according to FIG. 1.

With the inventive method, digital signals, which can be used for sound or for pure data transmission, are transmitted according to FIGS. 2a and 2b as a digital data sound channel on the existing RF sound carrier(s) in the region of the base band above the normal audio channel, i.e. above 15 kHz. In the known dual sound carrier stereo system shown in FIG. 1 both of the RF sound carriers can be modulated with digital auxiliary signals. The second RF sound carrier must be used for the mono/stereo/dual sound switchover with a slightly reduced band width because of the 55 KHz switching carrier (FIG. 2b). The auxiliary digital signal is modulated onto each RF sound carrier with reduced amplitude, for example, 20 per cent of the peak amplitude. In order to guarantee good compatibility with the existing picture and sound signals, the digital base band channel coding is so chosen that the energy distribution of the spectrum is as even as possible and that the spectrum also has a pseudorandom distribution in the modulation intervals. The influence on the existing picture or sound signals can be minimized through the preferred coupling of the clock frequency with the television line frequency and through a favorable frequency offset for the clock frequency. The effort required for the clock regeneration in the receiver is reduced by the frequency coupling.

Using a combination of multistage channel codes (for example, PSK, duobinary codes and similar codes) and known sound coding techniques with reduced bit rates, (such as that taught in DE-PS 36 39 753) the additional transmission capacity which is created is sufficient to transmit a high quality digital stereo signal pair with CD quality. However, the auxiliary signals for spatial sound transmission can also be accommodated in these digital supplementary channels. Data signals with relatively high bit rates can be transmitted in place of sound channels or also in addition to the sound channels mentioned. There are many possible applications for this type of data transmission; for example, (a) data services accompanying television, such as teletext, (b) improved PAL systems, (c) television systems with modified picture format, (d) coding systems, (e) pay-TV, and (f) independent mobile or stationary data services, such as traffic control and disaster services.

Figure 3A:
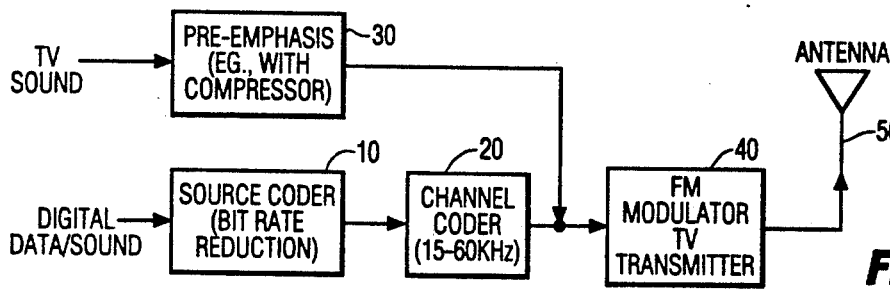
FIG. 3a is a block diagram of a television sound transmitter for carrying out the inventive transmission method.

With the inventive method, reliable transmission coverage of an entire area is achieved through the high transmission output and almost exclusive use of directional antennas on both the broadcast and the receiver sides. The directional distance, transmission reliability and error rate of the system depend on the depth of modulation of the auxiliary signal. At least 20 per cent of the depth of modulation for the normal television sound is permissible without compatibility problems arising. This is approximately equivalent to an amplitude at least 10 kHz for the digital auxiliary signal with a peak amplitude of 50 kHz for the normal television sound signal. In order to broadcast the first and second sound carriers which are FM-modulated as shown in FIG. 1 with the base band signal modulated as shown in FIGS. 2a and 2b, the digital data signals, or digitized audio signals, are fed to a source coder 10 corresponding to the block diagram shown in FIG. 3a, whereby, in the case of audio signals, the coder 10 carries out bit rate reduction simultaneously with the source coding. The source-coded data is so shaped by a subsequent multi-stage channel coder 20 that its spectral energy components are distributed as evenly as possible in the frequency range above 15 kHz through to about 60 kHz. To attain the even distribution multistage PSK coding, multistage QAM coding, or multistage vestigial sideband or single sideband (SSB) AM coding can be used and an even spectral distribution is assured even in the modulation intervals by a pseudo random-signal. With the transmission of low data capacities, for example, for a more reliable data transmission, duobinary or biphase codes can be provided.

With channel coding, the clock frequency of the channel-coded signal is preferably coupled with the television line frequency and the clock frequency is offset, with respect to the television line frequency, in such a way that reciprocal disturbances between the channel-coded signal and the television picture and sound signal are minimized. The channel-coded data, together with the analog television sound signal, which can be compressed if necessary using a compressor or a compander, is fed to an FM modulator 40 in the television transmitter. The modulator 40 frequency-modulates and amplifies the base band signals and then broadcasts them via the antenna 50. Instead of compressing the analog television sound signal, a controlled pre-emphasis may also be provided in a known manner. When using compressors, companders or controlled pre-emphasis for the existing analog audio channel, the depth of modulation for the digital channel can be increased markedly and, therewith, the coverage and the transmission reliability are further improved.

Figure 3B:
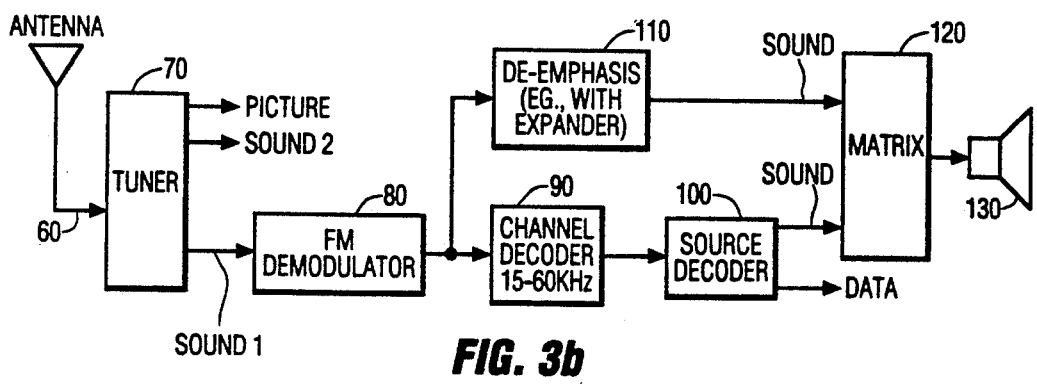
FIG. 3b is a block diagram of a television receiver for carrying out the inventive receiving method.

In remotely located, critical reception areas of a television transmitter, depending on the bit error rate of the digital audio signal, automatic switchover to the reliable analog audio signal can be provided in the receiver, as is explained by reference to FIG. 3b. The television signal which is received at antenna 60 is fed to a tuner section 70 of the television receiver. The tuner separates the picture signal and the two FM sound carriers and feeds the three signals to corresponding demodulators. Each of the two FM sound carriers can be processed in the subsequent stages shown in FIG. 3b. For example, the sound carrier 5.5 MHz (sound 1) is fed to the FM demodulator 80 which forwards the demodulated base band signal (FIG. 2a) to a channel decoder 90 and a deemphasis stage 110. If necessary the deemphasis stage 110 can include an integrated expander. The channel decoder 90 separates the digital data/audio channel in the frequency range above 15 kHz (FIG. 2a) from the base band signal and does the required channel coding. The channel-coded digital data/audio signal is subjected to source decoding in stage 100, and the audio signal is also subjected to digital-to-analog conversion. The additional audio signal available at stage 100 and the normal television sound signal available at the output terminal of the deemphasis stage 110 are simultaneously provided to a selection circuit 120. Selection circuit 120 passes the additional audio signal to speaker 130 when the additional audio signal is good quality, and the normal television sound signal when the error rate of the additional audio signal is high, i.e. a low quality signal. An additional possibility is that of using a 3-channel surround sound audio reproduction. In this instance, the selection circuit 120 switches back to exclusively normal audio reproduction when the error rate of the digital audio signal is too high.

As a result of the coupling of the clock frequency of the channel-coded signal and the television line frequency on the broadcast side, a reasonably priced and robust clock retrieval from the television line frequency can be achieved on the receiver side.

The following are examples of the types of information which can be transmitted using the digital signal:

a) support information for image reproduction with enlarged (for example, 16:9) picture aspect ratio;

b) information for mobile and/or stationary traffic control systems;

c) decoding information for pay-TV systems which are either subscriber-related (for example, granting or withdrawal of subscriber authorization) or public-related (for example, subscription allocation for a group of authorized persons):

d) paging systems;

e) digital switching and/or news information for disaster services and other remote control installations;

f) teletext data, for example, supplementary data for higher teletext levels.

I claim:

1. A method of transmitting digitally coded information in a television sound channel comprising the steps of:

inserting said digitally coded information on an existing frequency-modulated RF sound carrier as a channel-coded signal above a frequency band normally occupied by standard television baseband audio frequencies, within the baseband spectrum of a given television channel, said sound carrier being directly modulated with said digitally coded information in baseband form;

selecting the modulation amplitude so that disturbances during reproduction of the television sound are excluded in the receiver; evenly distributing the spectrum of said channel-coded signal over the available frequency range; using a pseudorandom-signal to maintain said even distribution during modulation intervals; and coupling the clock frequency of said channel-coded signal with the line frequency.

2. The method of claim 1 wherein said channel-coded signal is coded with a coding format selected from the group consisting of:

duobinary, biphase, single sideband (SSB), AM, and QAM.

3. The method of claim 2 wherein said television sound signal is compressed, and wherein the modulation amplitude of said channel-coded signal is raised in accordance with said compression.

4. The method of claim 3 wherein said digital information is subjected to source coding with data reduction prior to said channel coding.

5. The method of claim 4 wherein said digital information contains support data for image reproduction on enlarged aspect ratio television screens.

6. The method of claim 1 wherein said digital information is subjected to source coding with data reduction prior to said channel coding.

7. The method of claim 6 wherein said digital information contains support data for image reproduction on enlarged aspect ratio television screens.

8. A method according to claim 1, wherein
said clock frequency is offset in relation to said line frequency.

9. In a system for receiving a television signal comprising a sound channel including a frequency modulated sound carrier modulated by standard sound information and by coded digital information as a channel coded signal above a frequency band normally occupied by standard television baseband sound frequencies within the baseband spectrum of a given television channel, said sound carrier having a modulation amplitude such that disturbances during reproduction of television sound are substantially eliminated during sound reproduction, said channel coded digital signal having a spectrum evenly distributed over the available frequency range for said channel coded digital signal, and also having an associated clock frequency related to an image line frequency; apparatus comprising:
  a demodulator for demodulating said sound carrier to produce a baseband signal;
  a first processor responsive to said baseband signal for separating said digital information in a frequency band above a given baseband frequency; and
  a second processor responsive to an output signal from said first processor for producing a decoded output signal.

10. Apparatus according to claim 9, and further including
  a sound circuit responsive to said baseband signal from said demodulator and to said decoded output signal from said second processor; and
  sound reproducing means responsive to an output signal from said sound circuit.

11. Apparatus according to claim 10, wherein
said sound circuit selectively conveys said decoded output signal from said second processor and said baseband signal from said demodulator to said sound reproducing means as a function of sound signal quality.

12. Apparatus according to claim 9, wherein
said sound carrier is directly modulated by said digitally coded information in baseband form, and by said standard sound information in baseband form.

* * * * *